(No Model.) 2 Sheets—Sheet 1.
A. STANSEL.
GRAIN DRILL.
No. 541,697. Patented June 25, 1895.
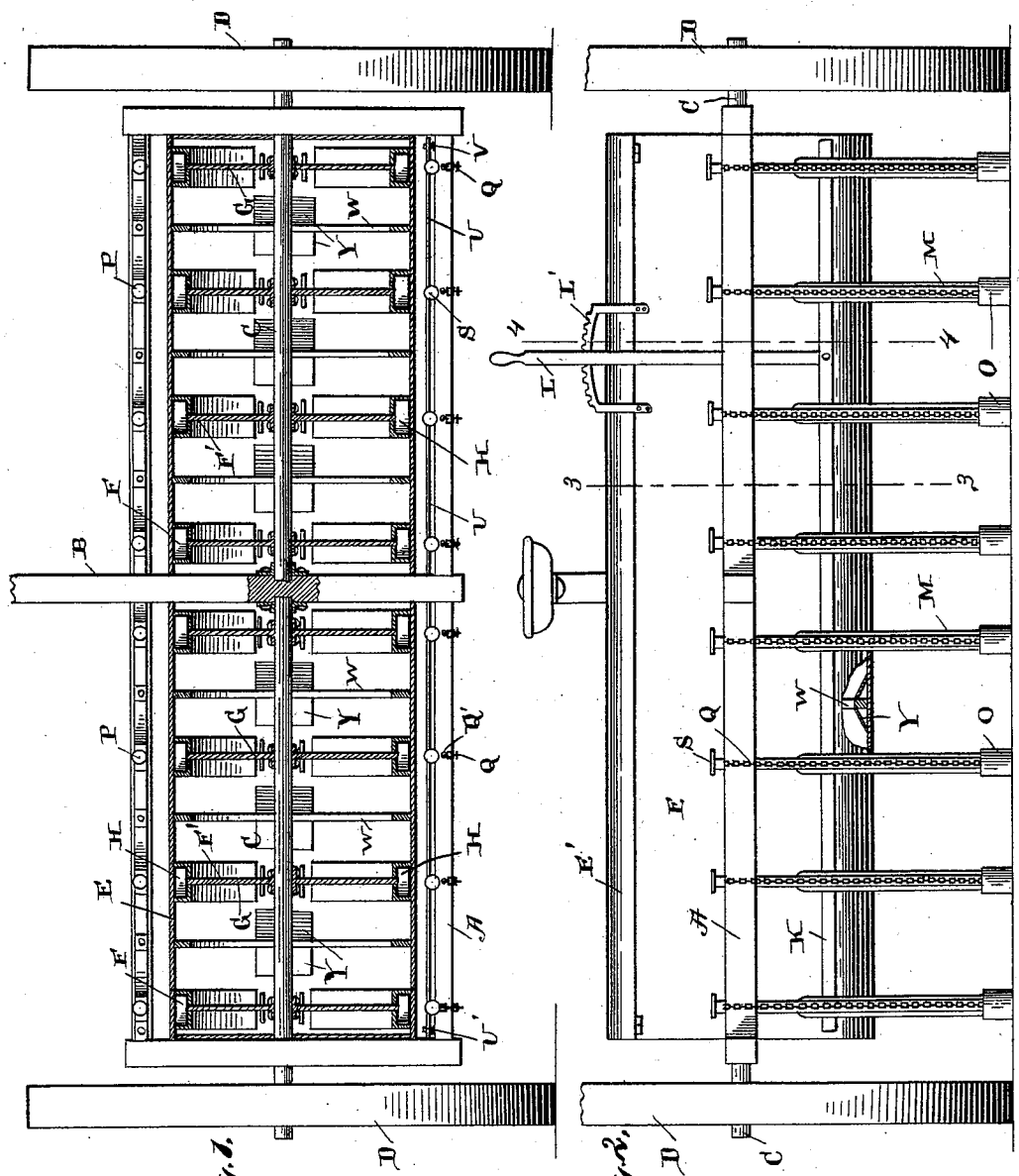
Witnesses
Geo. E. Frech.
James W Bercaw
Inventor
Alonzo Stansel
By Lehmann Pattison & Hedit
Attorneys (No Model.) 2 Sheets—Sheet 2.
A. STANSEL.
GRAIN DRILL.
No. 541,697. Patented June 25, 1895.
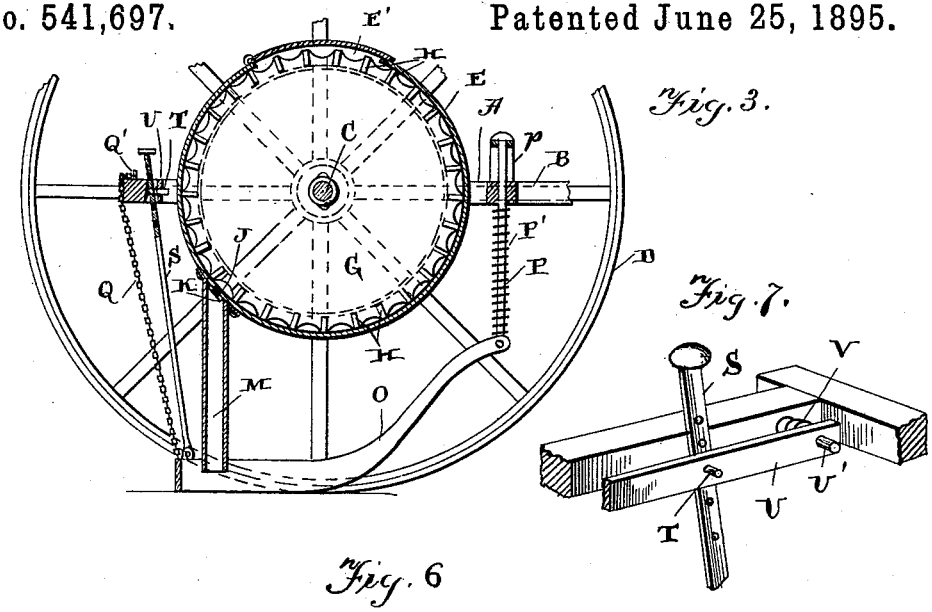
Fig. 3.
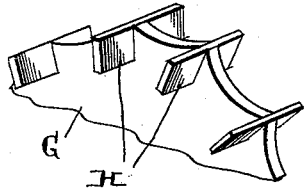
Fig. 7.
Fig. 6
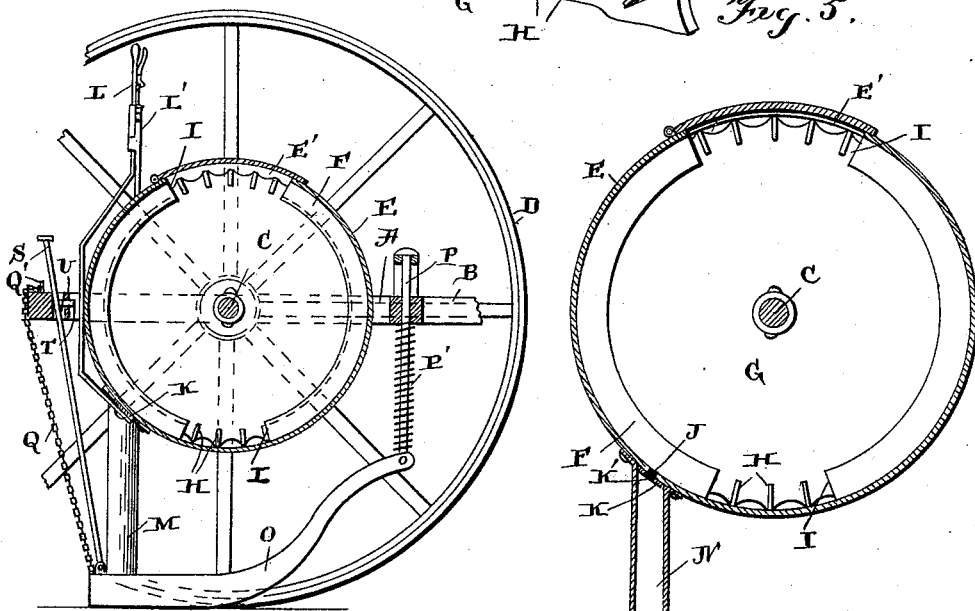
Fig. 4.
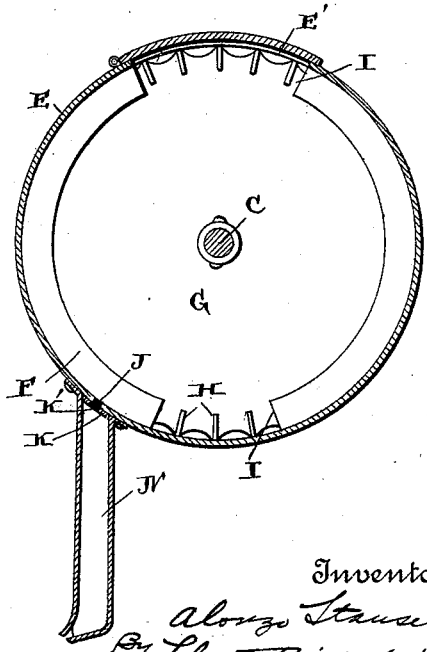
Fig. 5.
Witnesses
Geo. E. Fitch
James W. Berard
Inventor
Alonzo Stansel
By Lehman Pattison & Cash
Attorneys
THE NORRIS PETERS CO., PHOTO-LITHO., WASHINGTON, D.C.

UNITED STATES PATENT OFFICE.

ALONZO STANSEL, OF YORKVILLE, ILLINOIS.

GRAIN-DRILL.

SPECIFICATION forming part of Letters Patent No. 541,697, dated June 25, 1895.

Application filed October 10, 1894. Serial No. 525,519. (No model.)

*To all whom it may concern:*

Be it known that I, ALONZO STANSEL, of Yorkville, in the county of Kendall and State of Illinois, have invented certain new and useful Improvements in Grain-Drills; and I do hereby declare the following to be a full, clear, and exact description of the invention, such as will enable others skilled in the art to which it pertains to make and use it, reference being had to the accompanying drawings, which form part of this specification.

My invention relates to an improvement in grain drills; and the same is especially directed to the provision of an improved dropping or distributing mechanism which may be used for either drilling or broadcast sowing; and a further object is to provide an improved adjustment for the drill shoes.

The invention consists in the novel features of construction, hereinafter fully described and claimed, and illustrated in the accompanying drawings, in which—

Figure 1 is a transverse longitudinal sectional view of the implement. Fig. 2 is a rear elevation of the same. Fig. 3 is a vertical sectional view on line 3 3 of Fig. 2. Fig. 4 is a similar view on line 4 4 of the same figure. Fig. 5 is a cross-sectional view showing the implement adapted for broad-cast sowing. Fig. 6 is a perspective view of a portion of one of the blade-carrying disks. Fig. 7 is a similar view of a portion of a shoe-holding device.

A designates the angular frame of the implement and B the tongue arranged centrally across the same. The shafts C extend longitudinally through the frame in opposite directions and are journaled at their inner ends on opposite sides of the tongue and at their outer ends in the ends of frame A and on said outer ends are fixed the implement wheels D. Fixed within these frames and concentric with said shafts is the cylindrical drill casing or hopper E having upon its upper side the filling opening E'. Secured to the inner periphery of the said casing and at regular intervals are the circular pockets or guides F slotted upon their inner sides at F' and adapted to extend thereinto are the disks G which are secured to and revolve with the shafts C. Upon the peripheries of these disks are the blades H which fit snugly the pockets or guide-passages F in which they travel. The said pockets or guide-passages are interrupted at their upper sides immediately beneath the filling openings and also upon their lower sides. The last named interruption is for the purpose of taking grain and carrying it upward in the pockets while the upper interruption I is for the purpose of discharging or emptying into the casing any surplus grain which may have remained with the blades in passing the point of discharge.

Upon the rear side of casing E and slightly below the center thereof are the openings J into the several pockets F and arranged to close these openings entirely or to any desired degree is the longitudinally movable slide K having openings K' which may register with the said openings J or close the same as will be readily understood. This slide may be conveniently operated by a lever L which is held in the desired adjustment by rack L'.

The openings J discharge into the planting tubes M and in operation the disks G revolving with the central shaft take the grain at the bottom interruption I of the pockets and carry the same upward until said openings are reached when the grain will discharge thereinto and be passed to the earth. Between the blades H the peripheries of the disks are notched inward as shown so as to afford the grain plenty of room and not interfere with its free movement. In case the implement has been adjusted to discharge only a small quantity of the grain the surplus is carried upward as before explained until the upper sides of the pockets are reached when it will fall back into the casing E.

When the machine is being moved to the field or therefrom the slide K will be so adjusted as to completely close openings J and hold the grain from discharging. In this event the disks will simply carry the grain up to the upper discharges I of the pockets and there let it drop into the casing without harm. The axial shafts of the implement are made separate so as to facilitate turning and to increase the general effectiveness of the machine.

For broadcast sowing I simply provide the short tubes N, Fig. 5, but in drilling the said tubes are made longer as shown in the other figures and they lead to the furrow opening shoes O. These shoes are turned upward at their forward ends and are loosely connected to the lower ends of the rods P which are projected upward through the front bar of frame A and arranged on said rods between shoes O and the frame are the coiled springs P' which hold the shoes normally pressed downward but which will permit an upward yield when obstructions are encountered by the same. At the rear ends of the shoes are the usual chain lifts Q which at their upper ends are secured to pins Q' on the rear bar of the frame A.

For adjusting the shoes and holding them in the desired position I provide each with an upwardly extending bar S having a series of perforations which are adapted to engage pins T on the inner side of the said rear bar of the frame A as shown. By this arrangement it will be seen that the shoes may be raised or lowered and thus held as desired. For preventing said bars from moving off the pins I provide the longitudinal locking strip U which moves upon short pins U' projecting from the frame bar and which is held thereon by the coiled springs V. The said locking strips bear against the end of the pins T and therefore prevent the bars S from disengaging. The rods P at their upper ends extend through the front bar of the frame and the raised brackets p and are thus held and braced in their extended positions. In case it is not desired to hold the planting shoes positively at the rear ends the bars S may be put aside thus permitting a free movement of the shoes over the surface of the ground.

Referring to the casing E of the hopper it will be noticed that between the several pockets or guide-passages the same is provided with the circular brace ring W for the purpose of strengthening the casing, and that these rings at their lower sides are provided with the diverging bridges Y for directing the grain at the bottom of the casing toward the openings or interruptions L where it will be taken upward on the blades H.

Having thus fully described my invention, what I claim as new, and desire to secure by Letters Patent, is—

1. The combination of a grain container, disks arranged vertically and adapted to revolve therein, open ways into which the disks extend, blades on the peripheries of the disks which move in said ways, and ingress and egress grain openings for the ways, substantially as shown and described.

2. The combination of the casing, the ways F, the seed carrying disks G revoluble therein, the blades H secured transversely to the peripheries of the disks, the said disks being notched inward between the blades, and the discharges for the ways, substantially as shown and described.

3. In a grain drill the combination of the frame, a dropping mechanism, the shoes, the bars extended upward from the shoes, pins projected from the frame which the said bars are adapted to fit over, the outwardly movable locking plate for confining the bars on said pins and springs V for holding the said plate in position, substantially as shown and described.

In testimony whereof I affix my signature in presence of two witnesses.

ALONZO STANSEL.

Witnesses:
W. E. KINNETT,
O. C. KNUDSON.